March 25, 1969 A. W. FOWLER Re. 26,551

LINE CONTROL MEANS FOR A SPINNING REEL

Original Filed Jan. 28, 1963 Sheet 1 of 3

INVENTOR
ALVAH W. FOWLER

BY Head & Johnson

ATTORNEYS

LINE CONTROL MEANS FOR A SPINNING REEL

Original Filed Jan. 28, 1963

INVENTOR.
ALVAH W. FOWLER

BY Head & Johnson

ATTORNEYS

LINE CONTROL MEANS FOR A SPINNING REEL

Original Filed Jan. 28, 1963 Sheet 3 of 3

INVENTOR.
ALVAH W. FOWLER

BY Head & Johnson

ATTORNEYS

United States Patent Office

Re. 26,551
Reissued Mar. 25, 1969

26,551

LINE CONTROL MEANS FOR A SPINNING REEL

Alvin W. Fowler, Tarrant, Tex., assignor to Denison-Johnson, Inc., Mankato, Minn., a corporation of Minnesota Original No. 3,223,346, dated Dec. 14, 1965, Ser. No. 254,182, Jan. 28, 1963. Application for reissue Dec. 6, 1967, Ser. No. 698,066
Int. Cl. A01k *89/00, 89/04*
U.S. Cl. 242—84.2 4 Claims

Matter enclosed in heavy brackets [ ] appears in the original patent but forms no part of this reissue specification; mattter printed in italics indicates the additions made by reissue.

*ABSTRACT OF THE DISCLOSURE*

*A spin casting fishing reel in which the velocity of the line being cast is controlled by a pair of annular flange elements carried one by the line pickup rotor and the other by the front cover of the reel, which elements telescopically and progressively overlap as the rotor is manually moved axially forward, to thereby bend and frictionally retard line movement as desired.*

This invention relates to a fishing reel. More particularly, the invention relates to an enclosed spinning type fishing reel. Still more particularly, the invention relates to improvements in enclosed spinning type fishing reels including the provision of improved pickup means, the provision of improved drag means, and the provision of means whereby the reel may be easily and quickly adapted for use by either right or left handed fishermen.

Another object of this invention is to provide an enclosed spinning type fishing reel having an improved drag means including means of accurately and easily adjusting frictional tension applied to the unwinding of the reel as line is pulled from the reel.

Another object of this invention is to provide a fishing reel of a design utilizing the maximum number of nonmetallic components whereby the reel may be manufactured of inert materials, such as plastics, which, being rust resistant, extends the useful life of the reel.

Another object of this invention is to provide a fishing reel of the enclosed spinning type which is easy to manufacture and assemble and economical to produce.

Another object of this invention is to provide a fishing reel having an easily interchangeable spool.

[Another object of this invention is to provide an enclosed spinning type fishing reel including means whereby drag imposed on extraction of line from the reel may be variably increased by direct thumb pressure.]

*Another and primary object of the invention is to provide a spinning type fishing reel with means whereby frictional resistance imposed on the line as it is cast from the reel may be variably increased by thumb pressure so as to better control the distance and accuracy of the cast.*

These and other objects and a better understanding of the invention may be had by referring to the following description and claims taken in conjunction with the attached drawings in which:

DESCRIPTION

Figure 2:
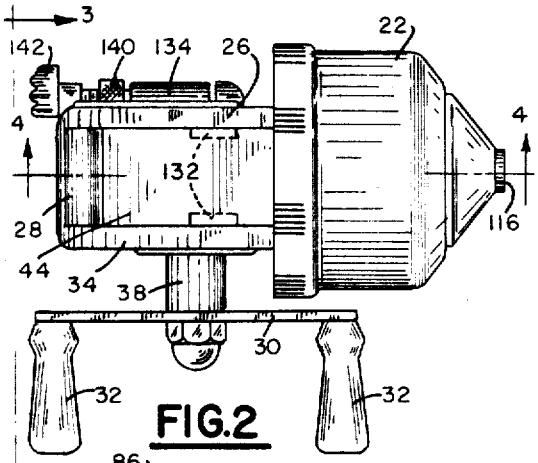
FIGURE 2 is a top view of the fishing reel.
Figure 1:
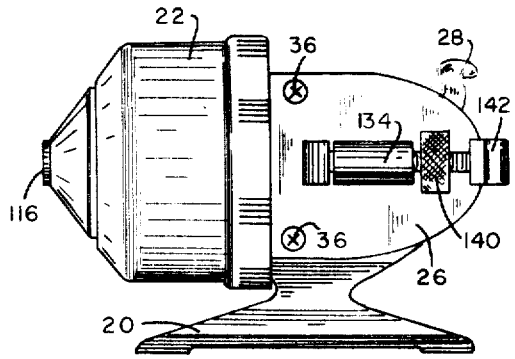
FIGURE 1 is a side view of the fishing reel of this invention.

It should be pointed out that the external embodiment of the fishing reel of this invention as shown in FIGURES 1 and 2 is merely exemplary of one design incorporating the novel principles of this invention and that for the most part the arrangement of components as externally appear in these views are substantially equal in some respects to the arrangements of other types of reels commercially available and that the novelty of the improvements making up this invention are primarily in the internal arrangements of the reel. The external configurations of the reel are, for the most part, shown and described for reference purposes only.

Referring now to the drawings and first to FIGURE 1, a side view of the fishing reel of the invention is shown. The reel is supported on a base 20 by which the reel is secured to a typical fishing rod, which is not shown. The forward portion of the reel is covered by a front cover member 22. A drag side panel 26 covers one side of the rear portion of the fishing reel and carries a drag system which will be fully described subsequently.

A trigger member 28 is provided, adaptable to receive thumb pressure of the operator by means of which the reel is controlled. A rewind lever 30 rotatably supporting handles 32 provides a means of rewinding a fishing line within the reel in a manner to be described subsequently.

Figure 3:
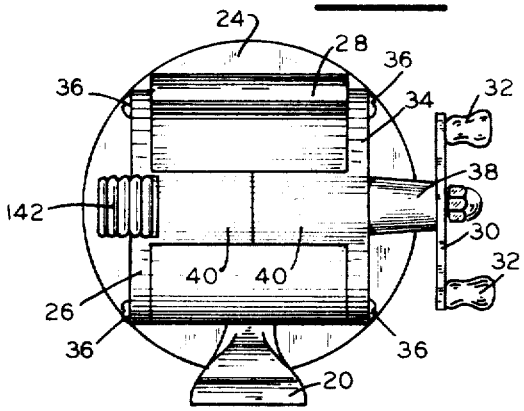
FIGURE 3 is a rear view of the fishing reel as would be seen along the line 3—3 of FIGURE 2.

Referring to FIGURE 2 and FIGURE 3 other externally viewed portions of the reel may be seen. A wind side panel 34 is supported to the reel opposite the drag side panel 26. The reel as shown in FIGURES 1, 2 and 3 is shown as it would be used by a right handed fisherman with the wind side panel 34 to the right of the reel and the drag side panel 26 to the left. A unique feature of the reel is the provision of means whereby the side panels 26 and 34 are reversible so that by merely removing screws 36, which hold the side panels 26 and 34 in place, the panels may be quickly reversed, adapting the reel to be used by a left handed fisherman.

Extending from and integrally formed with side panel 34 is a crank shaft bearing 38. As shown in FIGURE 3 each of the side panels 26 and 34 includes an integrally formed perpendicularly extending rearward panel 40 which meets together to form the central rearward portion of the reel enclosed.

Figure 4:
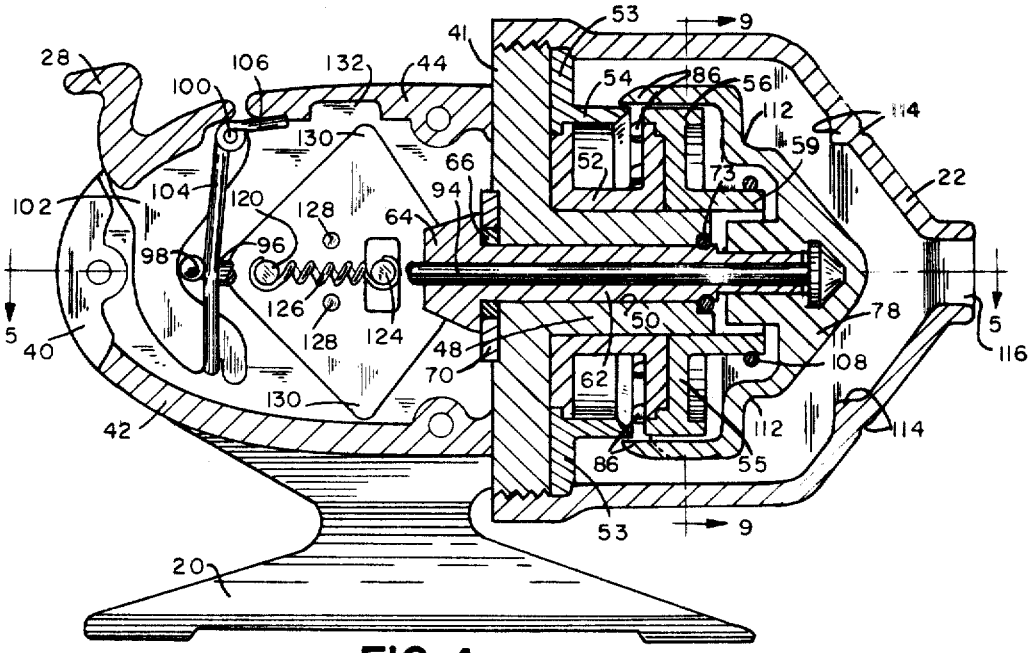
FIGURE 4 is an enlarged cross-section of the fishing reel as taken along the line 4—4 of FIGURE 2.

As best shown in the cross-sectional view of FIGURE 4 the main body housing or frame of the reel consists of a cylindrical body portion 41, a lower body portion 42, the integrally formed base 20, and an upper body portion 44. One of the novel features of this invention, as previously mentioned, is the provision of a fishing reel which may be composed of substantially all plastic components. When such portions of the reel as upper body member 44, lower body portion 42, base 20 and cylindrical body portion 24 are formed of plastic components they may be easily bonded together such as by the normal means of a plastic cementing compound or the frame may be cast as an integral unit.

As shown in FIGURE 4, the cylindrical body portion 41 has an integrally formed axially extended spool support shank 48, having an axial opening 50 therein.

Figure 18:
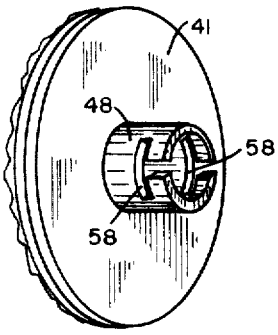
FIGURE 18 is an isometric view of the forward part of the body portion of the reel showing the integral spool support shank and the notch formed therein.
Figure 12:
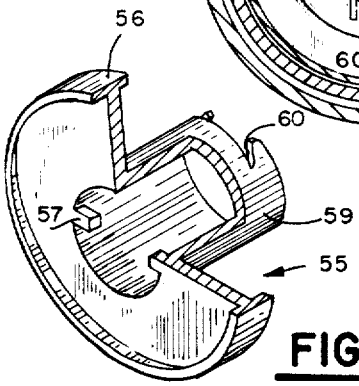
FIGURE 12 is an isometric view of the spool retainer member of the fishing reel.
Figure 5:
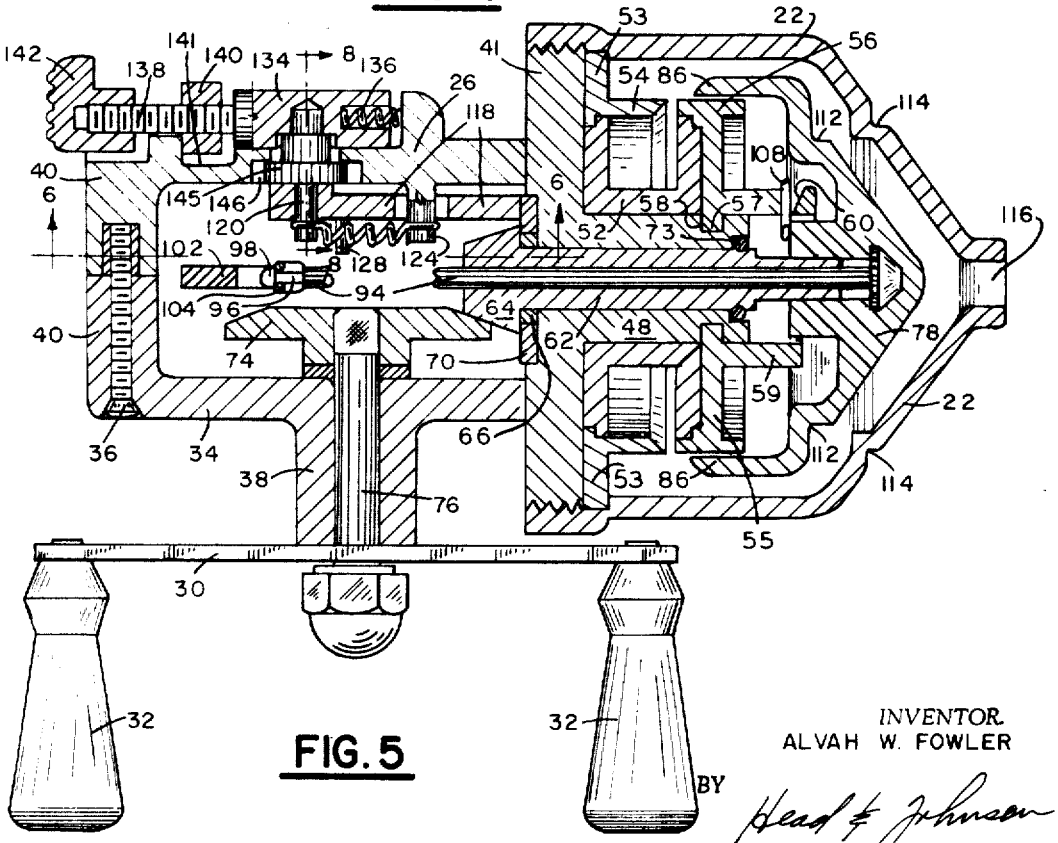
FIGURE 5 is an enlarged cross-sectional view of the fishing reel as taken along line 5—5 of FIGURE 4.

Supported axially about spool support shank 48 is spool member 52. Supported against the forward wall of the cylindrical body portion 41 is cylindrical spool shroud portion 53 which is held in place by cover 22. The spool shroud member 53 has an integral, axially extending cylindrical shroud portion 54 covering a portion of spool member 52. Positioned on the front end of support shank 48 is a spool retaining member 55, the configuration of which is best shown in FIGURE 12. The spool retaining member is provided with an integral axially extending cylindrical shroud portion 56 of the same external diameter as the shroud portion 54 of the spool shroud member 53. As shown in FIGURE 12, the spool retaining member is provided with integral inwardly extending lugs 57 which enter and lock in notch 58 in spool support shank 48 (see FIGURE 18). As shown in FIGURES 4, 5 and 12, the spool retaining member 55 is provided with an integral forwardly extending tubular portion 59 having a notch 60 formed therein, the purpose of which will be described subsequently.

Figure 13:
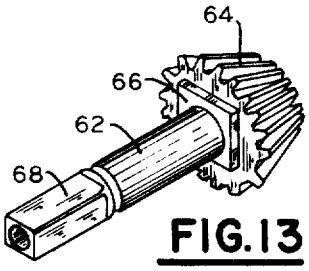
FIGURE 13 is an isometric view of the pinion member of the fishing reel.
Figure 14:
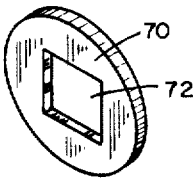
FIGURE 14 is an isometric view of the drag clutch member of the fishing reel.

Referring back to FIGURE 4, shown rotatably supported in opening 50 of the spool support shank 48 is a hollow pinion shaft 62 having at the rearward end thereof a pinion gear 64. The pinion member is best shown in FIGURE 13. Adjacent the pinion gear 64 is an integrally formed square section 66 and at the end of pinion shaft 62 opposite gear 64 the pinion shaft is of a non-cylindrical configuration such as external square configuration 68. As shown in FIGURES 4 and 5, positioned between pinion gear 64 and vertical body panel 41 is a drag clutch 70. The drag clutch 70 is shown best in FIGURE 14. The drag clutch 70 is a flat disc having a square opening 72 formed in the center thereof which receives the square section 66 of pinion shaft 62 so that the drag disc 70 rotates with the rotation of pinion shaft 62. A retaining spring 73 inserted in a groove about pinion shaft 62 retains the pinion shaft within the spool support shank 48.

As particularly shown in FIGURE 5, a rewind gear 74, rotatably supported by a rewind shaft 76, meshes with pinion gear 64. Shaft 76 rotates in the crankshaft bearing 38 and receives at its outwardly extending end thereof rewind level 30. Thus, manually rotating rewind lever 30 by handle 32 rotates rewind gear 74 and thereby pinion gear 64, pinion shaft 62, and clutch disc 70.

One of the major components of the reel, and one of the most unique features of the invention, is a cone shaped pickup member 78. The configuration of pickup member 78 is best shown in the cutaway isometric view of FIGURE 11. Pickup member 78 has an integrally formed coaxially extending cylindrical shank portion 80. The shank portion 80 has an axial square cross-sectional internal opening 82 which slidably receives the squared end configuration 68 of pinion shaft 62 so that pickup member 78 rotates with the rotation of pinion shaft 62 but nevertheless is axially positionable relative to the pinion shaft 62.

Pickup member 78 has a coaxial peripheral rearwardly extending flange portion 84 which terminates around the total rearward periphery thereof in a series of axially extending pickup points 86.

The outer periphery 88 of pickup member 78 is arcuately defined so that the pickup points 86 terminate at their rearwardly extremity in a sharp edge.

The shank portion 80 of pickup member 78 terminates in a perpendicular face 90. Extending from the perpendicular face 90 are integrally formed projections 92 which, as will be described subsequently, function to permit the pickup member 78 to move into rewind position when pinion shaft 62 is rotated.

Pickup points 86 formed on the pickup member 78 project in overlapping relationship with the shroud portion 54 of the spool shroud member 53 when the pickup member 78 is in rewind position as shown in FIGURE 4. Fishing line 93 which is wound within the reel on spool 52 (see FIGURES 15 through 17) extends from the spool when pickup member 78 is in rewind position, as shown in FIGURE 4, between pickup points 86.

Affixed at one end to pickup member 78 and axially extending therefrom is a cone shaft 94. Referring again to FIGURE 4, the hollow pinion shaft 62 rotatably and slidably receives cone shaft 94, the pinion shaft 62 serving as a bearing for the rotatable support of the pickup member 78. Formed in cone shaft 94 adjacent the rearward end thereof is a notch 96 (see FIGURES 4 and 5). The area between notch 96 and the end of shaft 94 is preferably in the configuration of a ball 98.

Figure 10:
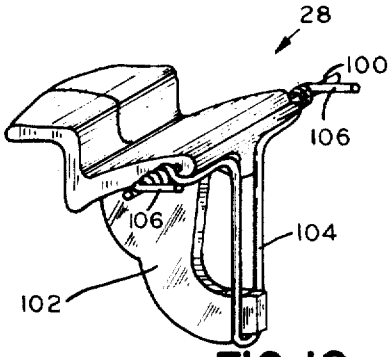
FIGURE 10 is an isometric view of the trigger member and trigger return spring member of the fishing reel.

Trigger member 28 is best shown in FIGURE 10. Trigger member 28 pivots about pivot rod 100 which extends into opening 99 (see FIGURES 6 and 7) in drag side panel 26 and wind side panel 34. A lower extending shank portion 102 of trigger member 28 supports one end of cone shaft retainer spring 104 which is of a paralleled configuration receiving, in the nature of a socket means, the ball 98 (see FIGURES 4 and 5) at the end of the cone shaft 94 therebetween. Thus, the position of trigger member 28 controls the position of pickup member 78 while the pickup member 78 is nevertheless free to rotate. A portion of the cone shaft retainer spring 104 extends around pivot rod 100 to form trigger return spring portion 106 which engages part of the upper body portion 44 (see FIGURE 4) to resiliently constrain trigger member 28, cone shaft 94 and therefore pickup member 78 in a rearward position.

Figure 9:
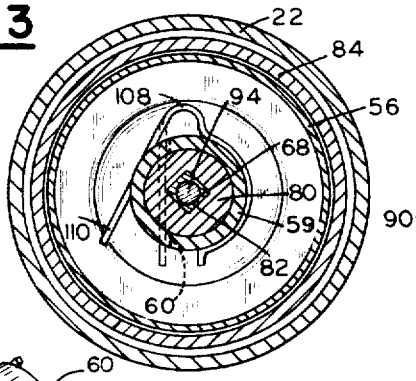
FIGURE 9 is a cross-sectional view taken along line 9—9 of FIGURE 4.

Referring to FIGURE 9 it can be seen that a pickup spring 108 is positioned semi-circularly around forward extending tubular portion 59 of spool retaining member 55. A substantially straight portion 110 of pickup spring 108 extends within notch 60 (see FIGURE 12). The function of pickup spring 108 is to maintain pickup member 78 in the cast position and to permit the return of the pickup member 78 to the rewind position when pinion shaft 62 is rotated, all in a manner to be described subsequently.

*As shown in FIGURES 3, 4, 11, 15, 16 and 17 the forward face of the pickup member 78 is formed with an annular groove 112 defined in part by the outer cylindrical surface of a circular flange-like portion or element that is integral with the member, and this groove is complemented by a mating internal annular projection 114 formed integrally with the cover member 22 and defined in part by a circular flange-like portion or element presenting an inner cylindrical surface adapted to telescopically receive the aforesaid outer cylindrical surface of groove 112.*

Figure 11:
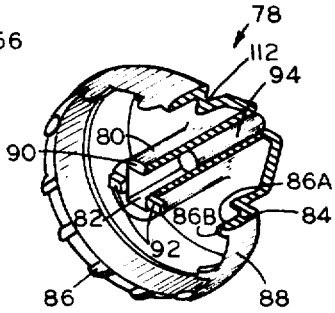
FIGURE 11 is an isometric view, partially cut away, of the pickup member of the fishing reel.

[As shown in FIGURE 4 and FIGURE 11, pickup member 78 has an integrally formed annular groove 112 which matches a mating internal annular projection 114 in the front cover member 22.] This mating pickup member groove 112 and internal annular projection 114 form an important function in the operation of the fishing reel of this invention which will be described subsequently. Front cover member 22 is tapered forwardly and terminates in a line opening 116.

Figure 8:
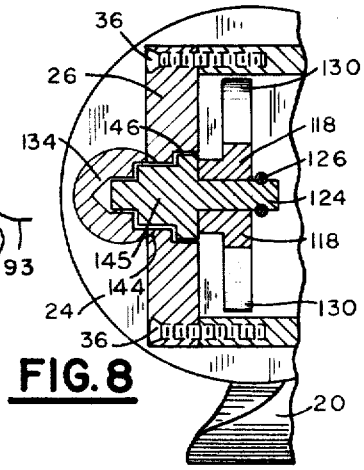
FIGURE 8 is a partial cross-sectional view taken along the line 8—8 of FIGURE 5 showing the cross-section of the drag side panel of the reel.
Figure 6:
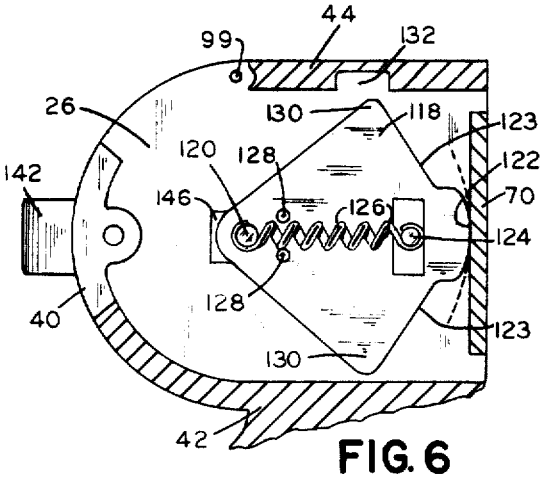
FIGURE 6 is a partial internal view showing the internal arrangement of the drag mechanism as the drag side panel of the reel is mounted on the left hand side of the reel as utilized by a right handed fisherman.
Figure 7:
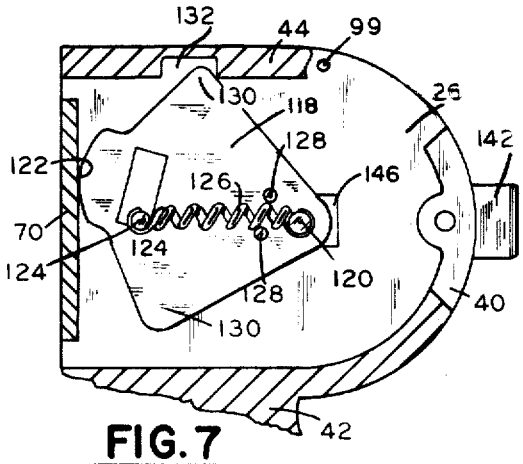
FIGURE 7 is a partial internal view showing the same drag mechanism as is shown in FIGURE 6 with the drag side panel moved to the right hand side of the reel as utilized by a left handed fisherman.

Another important as well as unique and novel portion of this invention is the braking system which is set forth best in FIGURES 6, 7 and 8. FIGURE 6 is a cross-sectional view taken along the line 6—6 of FIGURE 5 and shows the portions of the drag system of the reel which are supported internally of the drag side panel 26. As has been previously mentioned, a drag clutch 70 is affixed to pinion shaft 62 and rotates with it. Drag is obtained by frictional engagement of drag clutch 70 with a drag arm 118 pivoted about a pivot post 120, the pivot post 120 being supported in the drag side panel 26 and extending inwardly therefrom. Drag arm 118 has an arcuate drag surface 122 extending to slidably engage the drag clutch 70. The drag surface 122 of drag arm 118 extends through an arc of only a few degrees with the balance of the forward face 123 of drag arm 118 tapered away. The arc formed with drag pivot post 120 as a center by the pivotal displacement of drag surface 122 is shown in dotted line in FIGURE 6. The amount of frictional contact between drag clutch 70 and drag surface 122 of drag arm 118 will determine the amount of drag exerted to retard the extraction of line from the reel.

Extending from drag side panel 26 is a spring post 124 to which is affixed one end of a spring 126, the other end of the spring 126 being attached to the drag arm pivot post 120. Extending from drag arm 118 and positioned adjacent to each side of spring 126 are two positioning pins 128. These positioning pins 128 are in close proximity to spring 126 to constrain drag arm 118 in a substantially central position as shown in FIGURE 6.

Integrally formed with and extending from drag arm 118 are two opposing drag arm projections 130. The lower drag arm projection engages the lower body portion 42 when the rotation of drag clutch 70 is in a direction such as to pivot the drag arm 118 downwardly. Only a few degrees displacement of drag arm 118 is required to cause the lower drag arm projection 130 to engage the lower body portion 42 so that when the drag clutch 70 is rotated in such a direction the forward arcuate drag surface 122 of drag arm 118 firmly engages the drag clutch 70 to cause frictional retardation of the rotation of drag clutch 70. On the other hand, when the movement of drag clutch 70 is in a direction of rotation pivoting drag clutch 118 upwardly, upper drag arm projection 130 enters notch 132 formed in the upper body portion 44 so that drag face 122 is pivoted out of drag engagemnet with drag clutch 70. In FIGURE 7 drag arm 118 is shown in the position assumed when the reel is being rewound, rotating drag clutch 70 and pivoting drag arm 118 upwardly so that the frictional engagement between the drag face 122 and drag clutch 70 is just a very slight unnoticeable amount sufficient to maintain the drag arm 118 in an upwardly pivoted position. When the direction of rotation of drag clutch 70 reverses, as occurs when line is extracted from the reel causing reverse rotation of pickup member 78, pinion shaft 62 and thereby the drag clutch 70, the drag arm 118 is pivoted downwardly and due to the lower projection 130, the drag arm face 122 is held in frictional engagement with the drag clutch 70 retarding its rotation thereby retarding the extraction of line from the reel. Notches 132 are formed in the left and right sides of upper body portion 44 as shown by hidden lines in FIGURE 2.

As shown in FIGURE 5, the drag pivot post 120 is supported by a drag adjust body portion 134. The body portion 134 is constrained in a rearward position by spring 136. Referring to FIGURE 8, it can be seen that the drag adjust body portion 134 is slidably positioned in slot 144 formed in the drag side panel 26 so that the drag adjust body portion 134 is slidable forwardly and rearwardly of the reel. Drag pivot 120 extends to and is engaged by the drag adjust body portion 134. An integrally formed enlarged retainer button portion 145 is slidably positioned in an elongated groove 146 formed in drag side panel 26 to slidably support the drag adjust body portion 134 and the drag arm 118.

Referring back to FIGURE 5, the drag adjust body portion 134 includes a rearwardly extending threaded portion 138 which threadably receives a cylindrical internal threaded drag adjust member 140. An opening 141 in the drag side panel 26 permits the manual rotation of drag adjust member 140. Spring 136 retains the drag adjust body portion 134 in rearward position as determined by the threadable position of drag adjust member 140. Thus, by manual rotation of drag adjust member 140 the position of drag pivot post 120 and therefore the frictional engagement of the drag arm 118 with drag clutch 70 is adjusted.

An important novel feature of the reel of this invention is a means whereby the drag exerted by the reel, as line is extracted by a fish, can be variably increased by thumb pressure of the reel user. This means is provided by drag button 142 best shown in FIGURES 1 and 5. Drag button 142 is integrally affixed to the rearward end of threaded portion 138 of drag body member 134. As line is being extracted from the reel by the efforts of a fish which has been caught, increased drag may be imposed on the extraction of the line by the user exerting thumb pressure on button 142 which moves body member 134, drag pivot post 120 and therefore drag arm 118 forwardly into increased frictional engagement with drag clutch 70. Thumb pressure on drag button 142 increases the drag on the reel in excess of the minimum drag exerted which is adjustable by the rotation of drag adjust member 140. By the provision of an knurled external surface on drag adjust member 140 it can be easily adjusted by the side of the thumb of the user while the reel is in use.

OPERATION OF PICKUP MECHANISM

Figure 15:
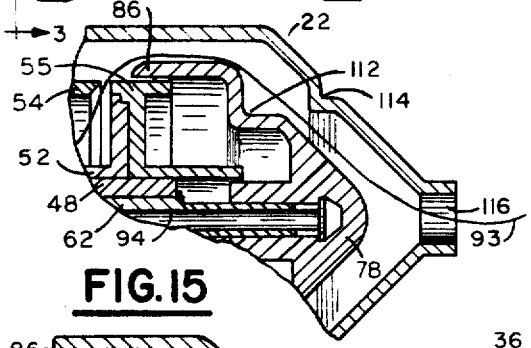
FIGURE 15 is a partial cross-sectional view of the forward portion of the fishing reel showing the pickup member in the cast position.

Referring now particularly to FIGURE 15, the means of the invention whereby fishing line 93 is rewound into the reel after it is cast is best disclosed. FIGURE 15 shows the fishing reel in casting position. In this position it is noted that the pickup member 78 is forward, so that pickup points 86 are positioned to overlay the peripheral radial flange portion 56 of spool retaining member 55, permitting line 93 to be freely unwound as it is extracted from the reel.

Each pickup point 86 (as shown in FIGURE 11) is preferably of a configuration defined by a lower flat surface 86A extending substantially parallel to the pickup member axis and an upper arcuate surface 86B of a curved configuration converging to meet the lower surface 86A at the rearward extremity of the pickup points 86.

In the cast position of the pickup member 78, as shown in FIGURE 15, pickup points 86 overlay the integrally formed peripheral radial flange portion 56 of spool retaining member 55 so that the pickup points do not interfere with the free unwinding of line 93 from spool 52. When it is desired to rewind line 93 onto spool 52, the user of the reel merely turns the rewind lever 32 in the direction of rewind which, by gear 74 and pinion gear 64, rotates pinion shaft 62 and thereby the pickup member 78.

Pickup member 78 is held in the cast position by pickup spring 108 which extends within notch 60 in the tubular portion 59 of the spool retaining member 55 and across the front face 90 of pickup member 78. When pickup member 78 is moved forward by downward pressure against trigger member 28, the perpendicular face 90 of the shank 80 of pickup member 78 is moved beyond spring 108 so that the straight portion 110 of spring 108, by natural resilience, flexes to extend within slot 60 to engage the face 90 of pickup member 78, holding pickup member 78 in the cast position. When the operator desires to rewind line 93, the rotation of pinion shaft 62 rotates pickup member 78 so that the projections 92 on the perpendicular face 90 engage pickup spring portion 110 and displaces it laterally, permitting shank 80 to move axially further into tubular portion 59 of the spool retaining member 55. This moves the pickup member 78 to the inward rewind position as shown in FIGURE 4 so that further rotation of shaft 62, by the engagement of pickup point 86 with line 93, winds line 93 onto spool 52.

In the rewind position of the reel as shown in FIGURE 4 the pickup points 86 extend to overlap the shroud portion 54 of the cylindrical spool shroud member 53. In this arrangement, the line 93 (not shown in FIGURE 4, see FIGURE 15) must extend between two adjacent pickup points 86. Thus the pickup action of the reel is positive, eliminating delay of engagement of the pickup mechanism with the line as occurs in some type of spinning reels.

This method of engaging line 93 to rewind it within the reel has many advantages over any of the known rewind mechanisms. First, as stated as one object of this invention, it is desirable to manufacture as many components of the reel as possible of plastic, since plastic is an ideal material for use in reels, being inert and not deteriorated by use around water. Most of the types of pickup mechanisms presently employed utilize one, or at most, two points of wear where line 93 rubs across the pickup mechanism as it rotates to wind the line within the reel. This invention provides a pickup member 78 having a multiplicity of pickup points 86 integrally formed therewith. The wear on the reel by line 93 as it is rewound will take place at the pickup points 86, but the novel provisions of this reel provides a multiplicity of pickup points 86 so that wear incurred in rewinding the line is distributed to a greater many points rather than limited to one or two. This means that the life of the reel, even if plastic is used as the material for formulating the pickup member 78, is greatly extended.

A second advantage of the pickup mechanism of this invention is its extreme simplicity. The only action in moving from the cast position to rewind position of the reel is the movement of pickup member 78 inwardly a fraction of an inch. This is accomplished simply by mere displacement of portion 110 of pickup spring 108 by projections 92 on wear where line 93 rubs across the pickup mechanism as it rotates to wind the line within the reel. This invention provides a pickup member 78 having a multiplicity of pickup points 86 integrally formed therewith. The wear on the reel by line 93 as it is rewound will take place at the pickup points 86, but the novel provisions of this reel provides a multiplicity of pickup points 86 so that wear incurred in rewinding the line is distributed to a great many points rather than limited to one or two. This means that the life of the reel, even if plastic is used as the material for formulating the pickup member 78, is greatly extended.

A second advantage of the pickup mechanism of this invention is its extreme simplicity. The only action in moving from the cast position to rewind position of the reel is the movement of pickup member 78 inwardly a fraction of an inch. This is accomplished simply by mere displacement of portion 110 of pickup spring 108 by projections 92 on the perpendicular face 90 of flange portion 80 of pickup member 78 as it is initially rotated. Thus there are no mechanical linkages and other types of arrangements to wear and get out of order. These are two basic advantages of the novel principles of this invention as relates to the pickup mechanism, other advantages being simplicity of manufacture, economy of construction and so forth.

Line 93 is extracted from the reel in the casting operation by unwinding from spool 52 over the periphery 88 of pickup member 78 and out line opening 116 in front cover member 22. Front cover member 22 is formed to substantially coincide, in at least part of its internal configuration, with at least a portion of the forward external configuration of pickup member 78. When trigger member 28 is depressed to its maximum downward position, cone shaft 94 is forced forward to the point where pickup member 78 engages the interior surface of front cover member 22 to trap line 93 therebetween. Thus, when trigger member 28 is pushed to its maximum downward position line 93 is firmly held by the reel. In the casting procedure, the fisherman using the reel of this invention will hold trigger member 28 downwardly with the plug, bait or other item (not shown) to be cast affixed to the line adjacent the end of his fishing rod (not shown) and will release the trigger member 28 at the end of the casting swing to freely permit the line 93 to unwind from around spool 52. At any time he desires to stop the unwinding of line 93, he may again push trigger member 28 downward to trap the line between pickup member 78 and front cover member 22.

Referring to FIGURE 13 it is shown that the forward portion 68 of pinion shaft 62 is of a square external configuration. Referring to FIGURE 11 it can be seen that the internal configuration 82 of pickup member 78 is of a matching square cross-sectional configuration so that the pickup member 78 is slidable on pinion shaft 62, but is rotationally locked to the pinion shaft 62. When pickup member 78 is in its cast position, it is nevertheless rotated by the rotation of shaft 62.

CASTING CONTROL MEANS

Figure 16:
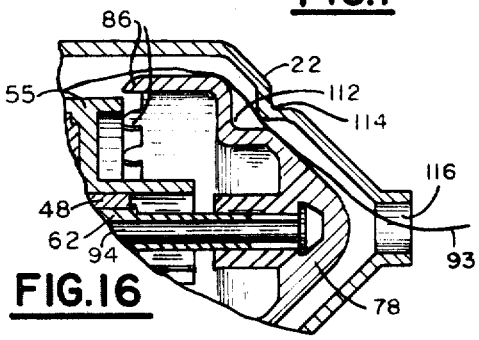
FIGURE 16 is a partial cross-sectional view of the forward portion of the reel showing the pickup member in a partially advanced position as a means of retarding extraction of line from the reel.
Figure 17:
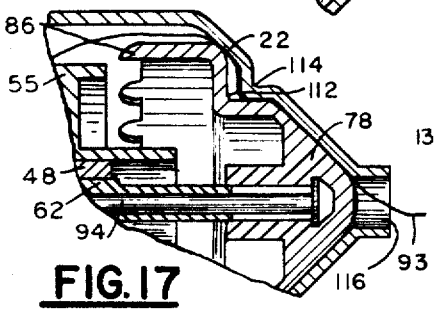
FIGURE 17 is a partial cross-sectional view of the forward portion of the reel showing the pickup member fully advanced to firmly engage the line to prevent further extraction of the line from the reel.

One disadvantage many fishermen find with enclosed types of fishing reels is the lack of provision for accurately controlling the casting of a fishing plug or bait. The presently available spinning reels have substantially only two attitudes for casting, either the line is freely extracted from the reel, or, when thumb pressure is applied, the extraction of the line is terminated. This invention sets forth a means of providing variable control of the extraction of line from the reel during casting. The means of accomplishing such casting control is best shown in FIGURES 15, 16 and 17.

As previously mentioned, front cover member 22 is provided with an inwardly extending integrally formed annular projection 114. Pickup member 78 is provided with an annular groove 112 which receives, when the pickup member 78 is in a forward position, the annular projection 114. FIGURE 15 shows the reel with pickup member 78 in casting position, which position permits free extraction of line 93. FIGURE 17 shows the pickup member 78 in its most advanced position in which line 93 is trapped against the inside surface of cover 22, preventing any further extraction of line 93. These are the two effective positions of presently available spinning reels. This invention provides the additional effect of the intermediate position of pickup member 78 as shown in FIGURE 16.

With pickup member 78 intermediately advanced the annular projection 114 formed in cover member 22 *telescopically engages the* [protrudes within] annular groove 112 so that line 93, as it is extracted from the reel, *is reversely bent and thus retarded by increasing* [is retarded by] frictional engagement with the annular projection 114 and the pickup member 78. The amount of frictional engagement or drag on line 93 is determined by the extent of advancement of pickup member 78, which in turn is controlled by thumb pressure on trigger member 28. In this novel manner, the user of the reel of this invention has complete control over the extraction of line 93. He may let it extract freely, as in FIGURE 15, stop the extraction completely, as in FIGURE 17, or he may apply varying amounts of retardation on the extraction of line, as shown in FIGURE 16.

It can be seen that an obvious alternate embodiment of the invention includes the provision of an annular projection integrally formed on the forward face of the pickup member 78, and an annular groove formed internally of cover 22 in a manner such that the groove in the cover 22 receives the projection of pickup member 78. Such an arrangement would function in the same way to impose a retardation on line 93 as the pickup member is advanced by thumb pressure on trigger member 28.

The terms annular projection and annular groove include any cooperating geometric arrangements of pickup member 78 and cover member 22 which will impose varying frictional engagement with line 93 as the pickup member is controllably forwardly positioned by trigger member 28.

As is apparent from the description the pickup member 78 of the reel has two static positions, that is, two positions where it will remain without manual force exerted on trigger member 28. The first static position is the rearward or rewind position as shown in FIGURE 4. The pickup member 78 is constrained in or toward this position at all times by trigger return spring 106. In this rearward or rewind position pickup points 86 extend over both the radial flange 56 of the spool retaining member 55 and the shroud portion 54 of the spool shroud member 53 so that line 93 is trapped between two adjoining pickup points 86. In this rewind position, rotation of pickup member 78 will wind line 93 on spool 52 and conversely, extraction of line 93 from the reel rotates pickup member 78 to put into action the drag mechanism previously described. In the second static position, termed the cast position, as shown in FIGURE 15, the pickup member is held in a forward position by pickup spring 108. In this cast position pickup points 86 overlay the radial flange 56 of the spool retaining member 55 permitting the free extraction of line 93. Pickup member 78 is placed in the cast position by manually depressing trigger member 28, moving pickup member 78 forward allowing the straight portion 110 of spring 108 to move inwardly so that it will intersect the vertical face 90 of pickup member 78 when thumb pressure is removed from trigger member 28. Pickup member 78 will remain in this position until it is rotated by the turning of rewind lever 30, in which event projections 92 encounter spring straight portion 110, displacing it and allowing the pickup member 78 to return to rewind position. The other positions of pickup member 78 as shown in FIGURES 16 and 17 are not static, that is, the pickup member 78 will assume such positions only as long as thumb pressure is exerted on trigger member 28.

CONVERTING FROM RIGHT TO LEFT HANDED REEL

One of the novel and important features of this invention, as has been previously mentioned, is the provision whereby the fishing reel may be easily and quickly adapted for either right handed or left handed fishermen. The reel is shown as it is used by right handed fishermen with the rewind lever 30 and handles 32 positioned to the right of the reel as the reel is positioned with the line opening 116 away from the user. When it is desired that the reel be used by a left handed fisherman, drag side panel 26 is moved to the right side of the reel and the wind side panel 34 is moved to the left side of the reel. The operation of the reel remains exactly the same. As the left handed fisherman winds the reel in taking up line 93, pinion shaft 62 will be rotated in the opposite direction but as the pickup member 78 and all of the elements supported therewith are symmetrical, the line 93 is wound on the spool 52 in the opposite direction without any change in the mechanism or the function of the mechanism in moving from cast to rewind position.

In shifting the reel from right to left handed fishing the drag mechanism of the reel must function to retard the rotation of pickup member 78 in the opposite direction, but this is accomplished automatically by the novel provisions of this invention. FIGURE 6 discloses the attitude of the drag arm 118 relative to drag clutch 70 as the drag side panel 26 is positioned on the left side of the reel for use by a right handed fisherman. As shown in FIGURE 6, as the reel is rewound by a right handed fisherman drag arm 118 is pivoted upwardly by drag clutch 70 so that upper projection 130 enters notch 132 in the left side of upper body portion 44, in which position no resistance is imposed on drag clutch 70, but when drag clutch 70 is rotated in the opposite direction, as occurs when line is extracted from the reel, lower projection 130 encounters lower body portion 42 retaining the drag surface 122 in contact with drag clutch 70, imposing a frictional retardation on drag clutch 70 and therefore on the rotation of pickup member 78, thus retarding the extraction of line 93. When drag side panel 26 is moved to the right side, adapting the reel for a left handed fisherman, the drag arm 118 functions in the same way except that upon rewind rotation of drag clutch 70 the upper projection 130 enters notch 132 formed in the right side of upper body portion 44.

As stated as an object of the invention, an important novel feature is the provision of a reel having an easily interchangeable or reversible line receiving spool. As best shown in FIGURES 4 and 5, the spool member 52 is symmetrical and is supported on spool support shank 48. The spool 52 member is easily exposed for removal by: (A) unscrewing front cover member 22: (B) removing pickup member 78 by pulling it forwardly so as to pull the ball end 98 of cone shaft 94 from engagement by cone shaft return spring 104; and (C) by rotating spool retaining member 55 to disengage lugs 57 from the notches 60 in tubular portion 55 of the spool retaining member 55. Spool 52 may then be slipped off the spool support shank 48. Steps are all accomplished manually, without tools and in a few seconds. A new spool 52 may then be placed in the reel and the components quickly reassembled.

As previously stated, one of the novel features of the reel of this invention is provisions for the ready conversion of the reel for either right or left handed use. When the reel is converted for alternate use the direction of wind of the line 93 on the spool 52 changes. Rather than going through the step of completely unwinding all of the line from the reel and then rewinding the line in the opposite direction on the reel, as is required in other types of reels, the spool member 52 of this invention may be quickly removed and reinserted into the reel in the opposite direction, ready for opposite hand use. Another advantage of the removable spool provisions of this reel is the possibility of use of the spool in another reel, such as a bait cast type rotating spool reel adaptable to receive and use the same spool as used in this reel.

It can be seen that the spool member 52, the spool shroud member 53, and the spool retaining member 55 may be formed of one integral piece if the feature of a removable and reversible spool member is not required. The term spool member in its broadest sense, as used herein, includes such an integral arrangement.

Although this invention has been described in a certain degree of particularity, it is manifested that many changes and modifications may be made without departing from the spirit and scope of this disclosure.

What is claimed:

1. In a fishing reel of the spinning type having a body member, a spool carried by the body member adaptable to receive a line wound thereon, an axially positionable pickup member supported adjacent and forward said spool, an external thumb controllable means for axially [positioning] *adjusting* said pickup member, and a cover member supported on said body member enclosing said spool and said pickup member, said cover member having an opening therein whereby a line wound on said spool may be extracted from said fishing reel, a means of controllably providing frictional [drag] *resistance* to the extraction of said line from said reel comprising:

an [extending] annular projection [integrally formed]

*extending* internally of said cover member, said pickup member having an annular groove [formed in the forward face thereof adaptable] *open toward the cover member* to receive said annular projection [of said cover member] when said pickup member is forwardly positioned, said annular projection adaptable to frictionally engage said line when said pickup member is axially [positioned] *adjusted by* said external thumb controllable means.

2. A fishing reel of the spinning type having a body member, a spool carried by the body member adaptable to receive a line wound thereon, an axially positionable pickup member supported adjacent and forward said spool, [and] *an* external thumb controllable means for axially [positioning] *adjusting* said pickup member, and a cover member supported on said body member enclosing said spool and said pickup member, said cover member having an opening whereby a line wound on said spool may be extracted from said fishing reel, a means for controllably providing frictional [drag] *resistance* to the extraction of said line from said reel comprising:

an [extending] annular projection [formed on] *extending from* one of the [internal surfaces] *faces* of said cover member and [the forward face surface] of said pickup member, and an annular groove [formed on] *open from* the other of such [surfaces] *faces* to receive the said [annular] projection when said pickup member is forwardly positioned, said annular projection adaptable to frictionally engage said line when said pickup member is axially forwardly [positioned] *adjusted* by said external thumb controllable means.

*3. In a fishing reel, a body member supporting a line spool and having a forward line opening, a circular pickup member coaxially mounted between the spool and said opening, with the line passing from the spool over the rim of the pickup member and to the opening, the pickup member being axially movable between fore and aft positions, a finger lever controlling the fore and aft movements of the pickup member, means for rotating the pickup member to retrieve line from the opening and wind it on the spool when the pickup member is in its aft position, the line being free to spin off of the spool and escape out through the opening when the pickup member is moved forwardly from its aft position, a means for applying controlled frictional resistance to the outward movement of the line comprising,*

*a pair of circular flange elements carried one by the pickup member and the other by the forward part of the [frame] body member, said flange elements [being] presenting cylindrical surfaces arranged to telescopically and progressively overlap each other in closely spaced relationship when the pickup member is moved forwardly so as to frictionally engage and reversely bend the line after it has passed over the rim of the pickup member to thereby apply controlled resistance to the line passing out through said opening.*

*4. The structure of claim 3 in which one of the flange elements is associated with an annular groove adapted to receive the other flange element.*

References Cited

The following references, cited by the Examiner, are of record in the patented file of this patent or the original patent.

UNITED STATES PATENTS

| | | | |
|---|---|---|---|
| 2,834,559 | 5/1958 | Nagy | 242—84.21 |
| 2,988,298 | 6/1961 | Purnell | 242—84.5 |
| 3,006,573 | 10/1961 | Holahan | 242—84.2 |
| 3,023,978 | 3/1962 | Denison et al. | 242—84.5 |
| 3,029,040 | 4/1962 | Wood | 242—84.2 |
| 3,061,230 | 10/1962 | Gayle | 242—84.2 |
| 3,061,231 | 10/1962 | Gayle | 242—84.2 |
| 3,105,651 | 10/1963 | Hull | 242—84.2 |
| 3,025,202 | 3/1962 | Sarah. | |
| 3,094,296 | 6/1963 | Nurmse | 242—84.21 |
| 3,128,059 | 4/1964 | Holahan. | |
| 3,160,363 | 12/1964 | Holahan. | |

BILLY S. TAYLOR, *Primary Examiner.*

U.S. Cl. X.R.

242—84.5

UNITED STATES PATENT OFFICE

CERTIFICATE OF CORRECTION

Reissue No. 26,551 March 25, 1969

Alvah W. Fowler

It is certified that error appears in the above identified patent and that said Letters Patent are hereby corrected as shown below:

In the heading to the printed specification, line 3, "Alvin W. Fowler" should read -- Alvah W. Fowler --.

Signed and sealed this 7th day of April 1970.

(SEAL)
Attest:

Edward M. Fletcher, Jr.
Attesting Officer

WILLIAM E. SCHUYLER, JR.
Commissioner of Patents